United States Patent [19]
Nehls

[11] Patent Number: 5,279,734
[45] Date of Patent: Jan. 18, 1994

[54] FILTRATION SYSTEM

[76] Inventor: Barry A. Nehls, 19302 N. Dixie Hwy., Bowling Green, Ohio 43402

[21] Appl. No.: 921,005

[22] Filed: Jul. 28, 1992

Related U.S. Application Data

[62] Division of Ser. No. 805,205, Dec. 9, 1991.

[51] Int. Cl.⁵ .................. B01D 29/52; B01D 29/72; B01D 36/04
[52] U.S. Cl. ..................... 210/295; 210/298; 210/345; 210/347; 210/332; 210/388; 210/406; 210/407; 210/416.5; 210/486; 277/74
[58] Field of Search .............. 210/298, 314, 317, 318, 210/388, 331, 332, 347, 407, 345, 406, 346, 295, 791, 486, 804, 168, 167, 232, 450; 277/74

[56] References Cited

U.S. PATENT DOCUMENTS

| | | | |
|---|---|---|---|
| Re. 32,135 | 5/1986 | Creps et al. | 210/260 |
| 2,494,534 | 1/1950 | Armstrong | 210/298 |
| 2,887,228 | 5/1959 | Harlan | 210/298 |
| 3,074,561 | 1/1963 | Mummert | 210/347 |
| 3,168,470 | 2/1965 | Rhoda . | |
| 3,407,572 | 10/1968 | Tolley | 55/283 |
| 3,491,887 | 1/1970 | Maestrelli | 210/330 |
| 3,542,205 | 11/1970 | O'Cheskey | 210/347 |
| 3,557,959 | 1/1971 | Muller | 210/142 |
| 3,585,133 | 6/1971 | Honan et al. | 210/411 |
| 3,643,803 | 2/1972 | Glos | 210/347 |
| 3,727,762 | 4/1973 | Padovan | 210/136 |
| 3,879,286 | 4/1975 | Berriman | 210/23 |
| 3,948,779 | 4/1976 | Jackson | 210/347 |
| 4,071,451 | 1/1978 | Wood | 210/79 |
| 4,394,272 | 7/1983 | Damerau | 210/298 |
| 4,396,506 | 8/1983 | Damerau | 210/298 |
| 4,404,101 | 9/1983 | Koch | 210/298 |
| 4,428,838 | 1/1984 | Creps et al. | 210/328.2 |
| 4,547,288 | 10/1985 | Little | 210/232 |
| 4,737,176 | 4/1988 | Lippert | 210/347 |
| 4,761,226 | 8/1988 | Creps | 210/106 |
| 4,844,794 | 7/1989 | Ziller | 210/97 |
| 4,985,146 | 1/1991 | Fox et al. | 210/413 |
| 5,004,540 | 4/1991 | Hendrick | 210/232 |
| 5,008,009 | 4/1991 | Ciaffoni | 210/193 |

FOREIGN PATENT DOCUMENTS

| | | |
|---|---|---|
| 74132 | 4/1952 | Denmark . |
| 732135 | 2/1943 | Fed. Rep. of Germany . |
| 818227 | 9/1937 | France . |
| 307619 | 8/1955 | Switzerland . |
| 698635 | 5/1978 | U.S.S.R. . |

Primary Examiner—Thomas M. Lithgow
Attorney, Agent, or Firm—Gifford, Groh, Sprinkle, Patmore and Anderson

[57] ABSTRACT

A filtration system for use in a settling tank includes a star shaped filter having equally spaced radial panels with the filter septums forming the downwardly extending sidewalls of each panel or compartment. The framework of the filter allows radial removal of the filter septums for cleaning and maintenance. A unique pressurized wet seal seals the filter to a clean liquid vacuum delivery duct and can also seal the system pump in the settling tank to the vacuum duct.

7 Claims, 4 Drawing Sheets

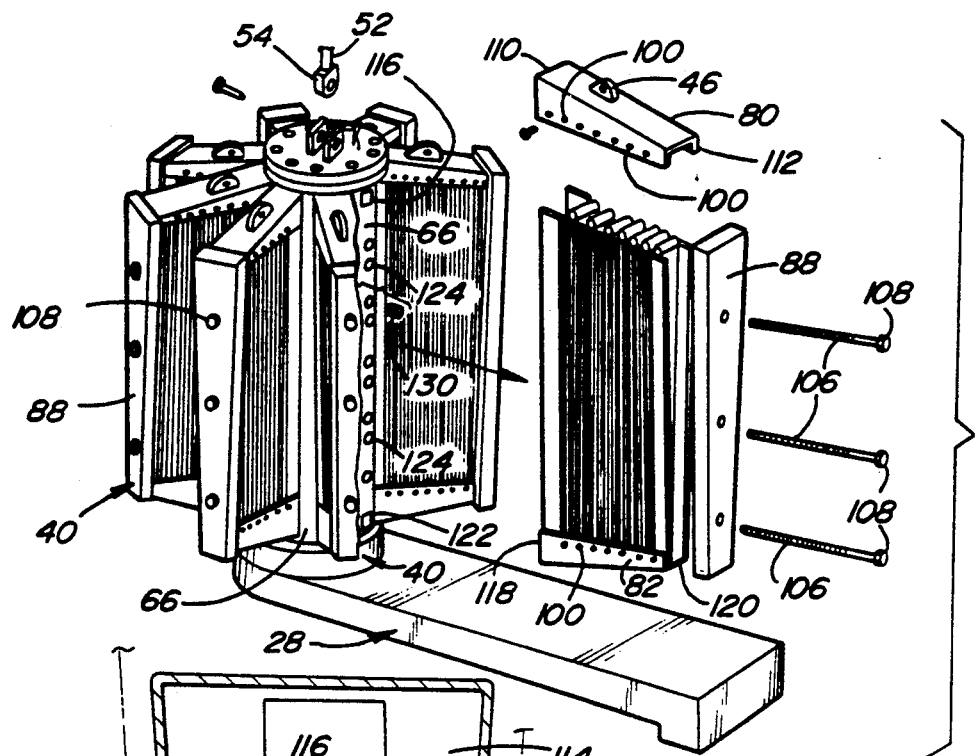
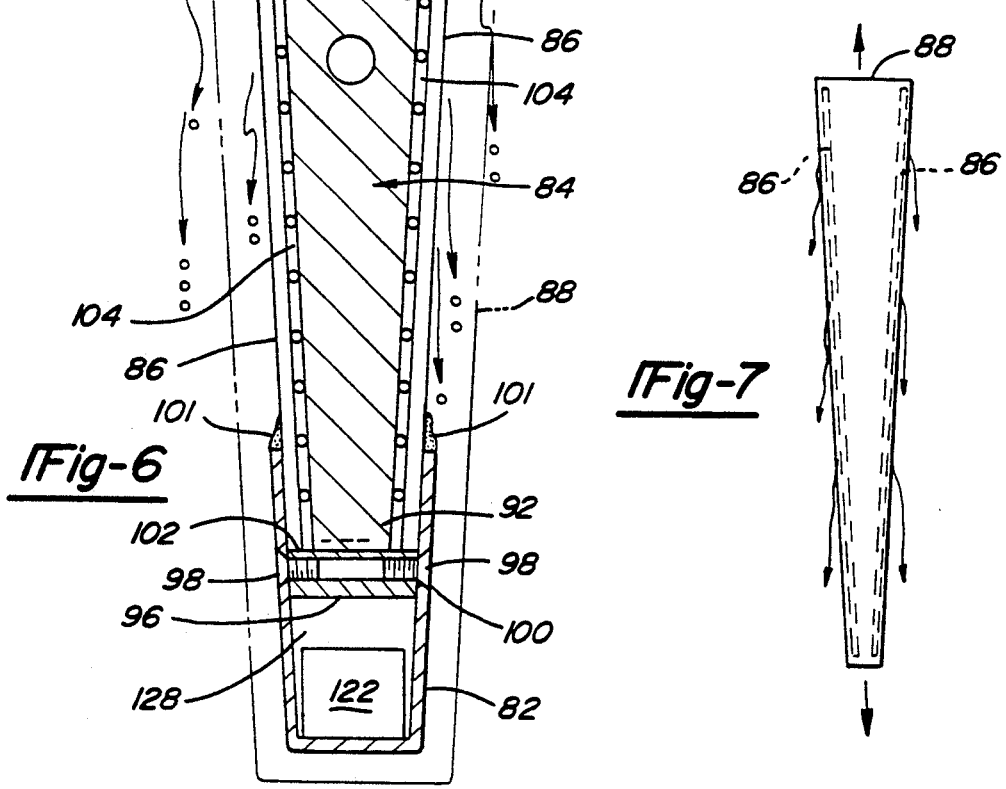

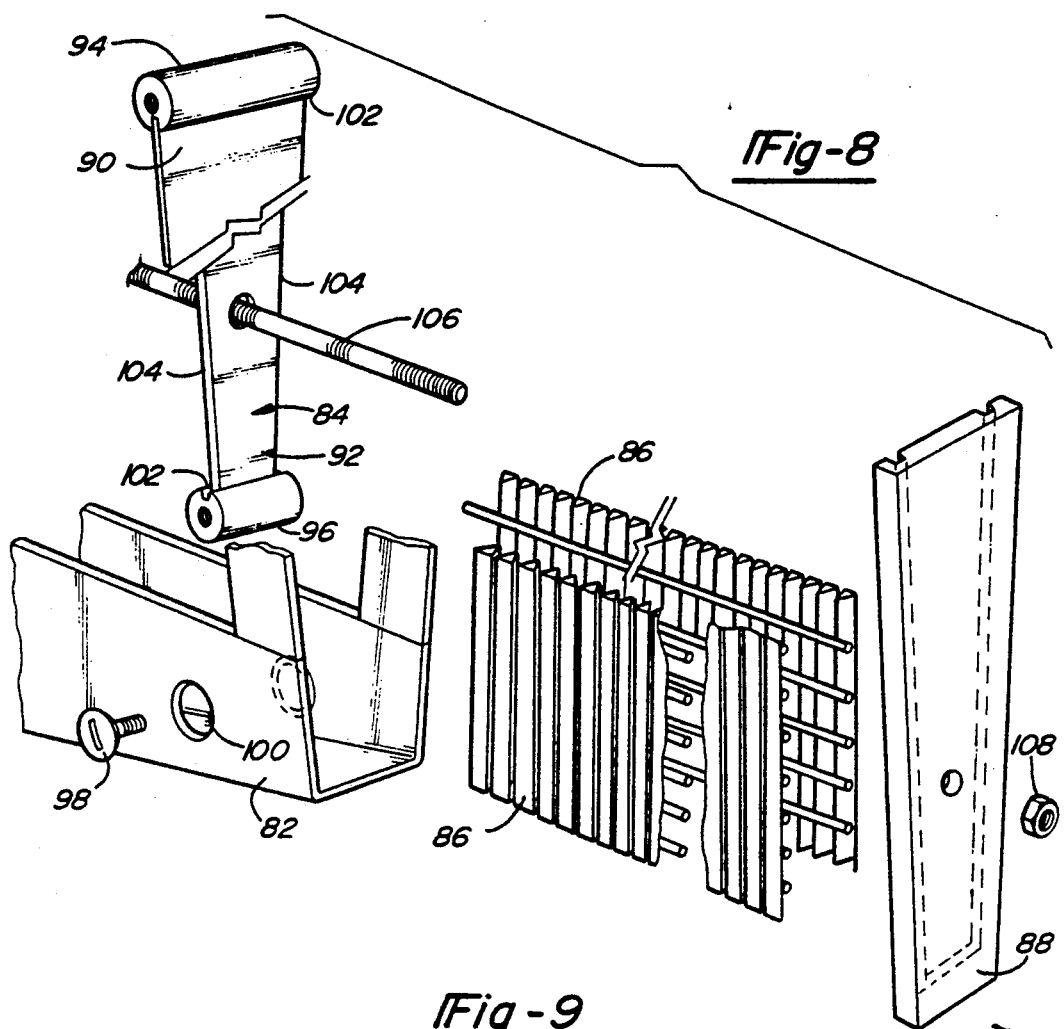
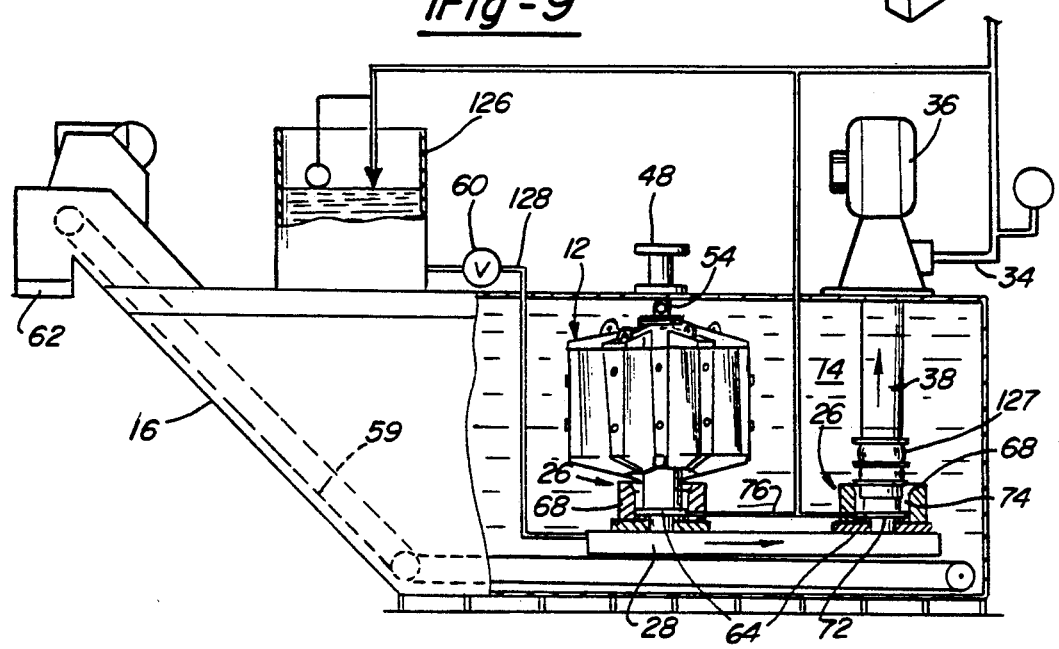

FILTRATION SYSTEM

This is a divisional of copending application(s) Ser. No. 07/805,205 filed Dec. 9, 1991.

BACKGROUND OF THE INVENTION

1. Field of the Invention

This invention relates to a filtration system. More particularly this invention relates to a filter which is located in a settling tank containing contaminated liquid to be filtered. Contaminants are removed from the liquid by the liquid passing through the filter, and the contaminants are removed from the tank by a continuous conveyor. Such systems are used for contiuously filtering liquids such as cutting, cooling and lubricating liquids used in conjunction with machine tools. Metal chips and particles of various sizes and shapes are removed from the liquid.

Even more particularly, this invention relates to a filtration system in which the filter is independent of the conveying system. The contaminants are removed from the filtering surface in the form of vacuum compressed filter cake which is deposited on the conveyor for removal from the settling tank.

2. The State of the Art

There is wide variety of tank filters used for separating solid metal particles from metal working fluids. A popular system uses a disposable rolled paper filter media which is carried through the tank by a continuous conveyor over a vacuum box which draws the liquid through the media depositing the contaminants on the media. The conveyor is advanced intermittently in synchronism with a vacuum break valve. Paper breaks and infiltration of contaminated liquid around the paper being fed into the tank pose some of the major difficulties with this system.

There is a variety of filters which are not carried by the conveyor but which are operated to continuously or intermittently clean the filtering surface of filter cake which is deposited on the conveyor.

Vertically and horizontally disposed drums are used with the filtering surface being at the periphery of the drum. Removal of filter cake is most commonly performed by doctor blades which scrape the filtering surface as the drum or blades rotate. Other systems use a backwash over a dedicated segment of the drum as it is being rotated. Various difficulties are encountered with the use of these drum filters. For example, with a horizontal drum, an air space tends to build up along the top inside surface which can eventually result in pump cavitation, and the air can also cause literally floating the drum as it is being removed for cleaning or repair. A primary disadvantage of both horizontally and vertically disposed drum filter lies in the difficulty involved in cleaning, repairing and replacing the filtering medium. Even where this medium is a wedgewire screen, which is relatively stiff, it is still fragile and cumbersome to handle as the filtering screen is slid off the drum framework. The drum configuration also limits the filtering area per unit of tank volume occupied.

A recent effort to increase filter area in a metal working system utilizes a pleated filter medium which is flexed by a diaphragm operator and is backwashed with clean liquid.

It is in the area of producing a new filter that can be readily serviced and cleaned and which has a structure that can provide an increased filter area for retrofitting existing tank-conveyor systems or used in a completely new filtration system with the elimination or reduction of prior disadvantages, that the present invention is directed.

SUMMARY OF THE INVENTION

The present invention is directed to a filter for use in a filtration system having a settling tank and a continuous conveyor for removal of contaminants screened out by the filter. The new filter has a "star" configuration with a central vertically extending column and a number of equally spaced radially extending panel elements or compartments attached to the column. The compartment spacing or number of compartments can be varied to accommodate the filter cake depth variations, but preferably there will be an even number of compartments so that there will be diametrically opposed compartments providing ease in handling and construction. Preferably there are six or eight compartments per filter.

The filter septums define the downwardly extending sidewalls of each compartment and are made of a suitable screen material. In a preferred embodiment of the invention, as illustrated in the drawing, the septum is made with stainless steel wedgewire. Other screen type materials of metal or plastic material may be suitable for a given application including microscreen and the like.

The panel or compartment framework of the filter which is attached to the central column includes a top member, bottom member and end cap which provides for easy removal of the individual filter septums for cleaning or replacement. Thus the individual star filter can be removed and replaced in their entirety and the individual septums can be cleaned, repaired or they can be replaced with septums of different materials or screen openings for any change in filtering conditions that might occur. With the mounting of two or more star filters in a given tank, and the use of multiple tanks, interchangeability of the filters and their parts greatly enhances overall operating efficiency and system sizing flexibility.

A unique slip-fit pressurized wet seal of the present invention allows the filters to be mounted in a dirty coolant tank environment without the use of rotary seals, 0-rings, bearings or other replaceable wear items.

In a preferred embodiment of the invention, the septums diverge outwardly as they extend upwardly. This provides a free fall gravity path for dislodged vacuum compressed filter cake.

The central column provides the internal collecting manifold with which the individual compartments are in fluid communication.

The pressurized wet seal seals the central column and hence the collecting manifold to a vacuum duct which in turn conveys the clean or filtered liquid to a clean tank which can be constructed integrally with the settling tank by the use of a dividing wall, or the clean tank can be external.

The pressurized wet seal provides a slip-fit which includes a bottom ring which extends radially outward from the bottom of the central column. A receptor ring is attached to the vacuum duct directly or through a mounting plate. The receptor ring slidably receives the bottom ring. A support ring within the receptor ring is also attached to the vacuum duct and acts an anvil during the regeneration or filter cake removal cycle. The support ring also supports the filter and seals against the bottom ring. The support ring is spaced radially inward from the receptor ring so that an annular chamber is defined by the receptor ring, bottom ring and support ring. A pipe supplies liquid under pressure to the chamber to prevent infiltration of contaminated liquid into the vacuum duct. Preferably the liquid is filtered solution supplied at a pressure slightly greater than the vacuum of the filtering process.

A bump cylinder or motor is mounted to the tank above the star filter and is removably connected to the filter to provide vertical displacement of the filter to jar or dislodge the filter cake. During the downward stroke of the cylinder, the bottom ring impacts against the support ring. During this cleaning cycle, the pressure in the collecting manifold, vacuum duct and clean or regeneration tank is equalized to atmospheric pressure to allow a back flow for the release of the compressed filter cake from the septum surface.

The pump creating the vacuum flow is normally immersed in the clean tank (often referred to as a regeneration tank), particularly where the clean tank is constructed integrally with the settling tank, and the vacuum duct is connected directly to the clean liquid tank.

The unique pressurized wet seal of the invention also may allow the pump to be mounted in the dirty environment of the settling tank directly to the vacuum duct. The bottom ring of the wet seal extends radially outward from the bottom of the pump casing. The receptor ring and base ring are positioned on the vacuum duct as in the case of the filter seal itself to create an annular chamber or passage to which the pressurized clean liquid is supplied.

In addition to the top member, bottom member, end cap and septum sidewalls, the framework of the star filter radial compartments also include a number of radially spaced, vertically extending support bars which are attached to the top and bottom members. The filter septums are held against these support bars. In the preferred form of the invention, where the septums diverge outwardly as they extend upwardly, these support bars are tapered from a larger top width to a smaller bottom width, and the top and bottom members are also accordingly made larger and smaller respectively.

In a preferred form of the invention, the top and bottom members are formed as channels. The top channel slopes downwardly from the column to the end cap to define a top gas collection passageway above the septums in fluid communication with the collecting manifold through a top orifice in the column. The bottom channel slopes upwardly from the column to the end cap defining a bottom contaminant passageway below the septums in fluid communication with the collecting manifold through a bottom orifice in the column. With this structure, entrapped air is vented from each compartment through the gas collecting passageway and the top orifice. Also the build up of any migrated contaminants in the compartment is avoided by the flow through the contaminant passageway and the bottom orifice.

Another preferred feature of the invention is the selective control of flow through the septums into the collecting manifold. This selective flow through the individual compartments is obtained by a series of vertically spaced tapped orifices between the upper and lower orifices. These orifices can be left open or plugged with conventional pipe plugs in order to provide the desired flow rate and pattern for the selected application.

BRIEF DESCRIPTION OF THE DRAWING

The advantages of the present invention will be more apparent from the following detailed description when considered in connection with the accompanying drawing wherein:

FIG. 5 in an exploded perspective view showing the construction of a star filter and its assembly to the vacuum duct;

FIG. 6 is a vertical cross sectional view through one of the filter panels or compartments showing further details of the compartment construction;

FIG. 7 is a diagrammatic vertical end view of a single panel or compartment showing the vertical drop of compressed filter cake during the regeneration, bump cleaning cycle;

FIG. 8 is a perspective exploded view showing the details of construction of the individual radial panels or compartments, and FIG. 9 is an elevational view similar to FIG. 1 showing an external clean liquid regeneration tank being fed by a pump sealed to a vacuum duct in the dirty liquid settling tank, the pump being sealingly connected to the vacuum duct by the pressurized wet seal of this invention shown in FIG. 4.

DETAILED DESCRIPTION OF THE PREFERRED EMBODIMENTS OF THE INVENTION

Figure 1:
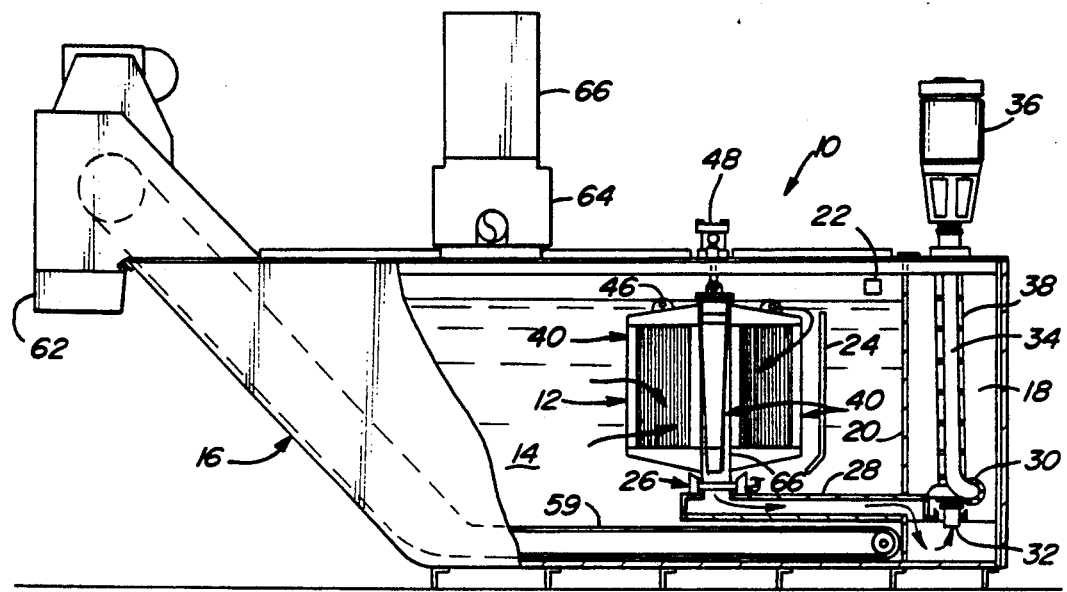
FIG. 1 is an elevational view of the filtration system of this invention showing a single star filter removably immersed in a settling tank with the flow of liquid being filtered through septum sidewalls into radial compartments and into a central column and then through a vacuum duct to a clean liquid tank.
Figure 2:
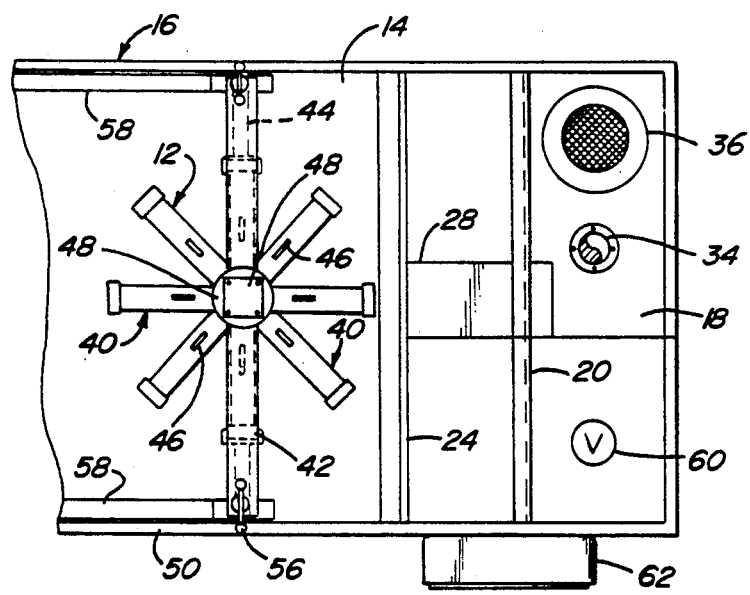
FIG. 2 is a partial plan view on an enlarged scale of the system of FIG. 1 showing some of the mounting details of the star filter.
Figure 3:
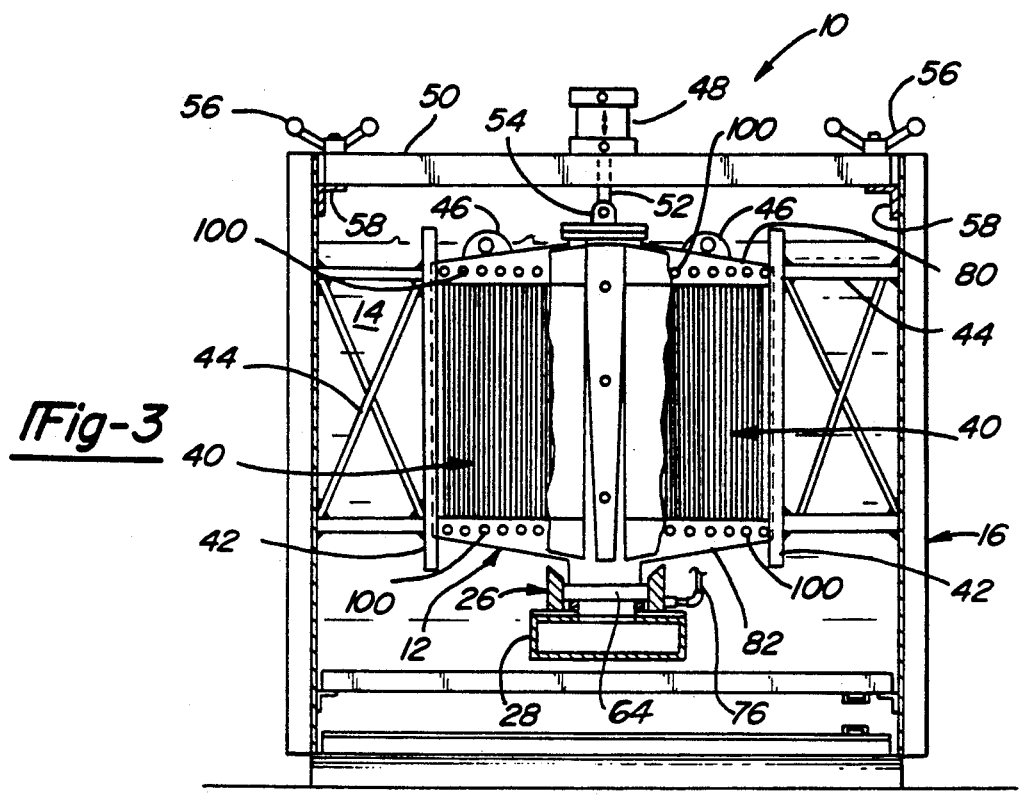
FIG. 3 is an end view of the systems of FIGS. 1 and 2 showing further mounting details and the pressurized wet seal of the invention.

Referring to the drawing, and particularly to FIGS. 1-3, the filtration system 10 of the invention includes a filter 12 removably mounted in a settling tank 14. The settling tank 14 occupies the larger volume of the overall tank structure 16 defining an open top tank having a lesser volume clean liquid or regenerating tank 18 formed in part by dividing wall 20.

Contaminated liquid to be filtered is introduced into the settling tank 14 by a distribution trough or similar pipe means 22 shown schematically in FIG. 1. The introduction trough 22 is located in the tank 14 at a point where in shielded by baffle wall 24 from the filter 12 so that any turbulence caused by the entering liquid will not disturb the filtering process including the build up of filter cake on the filtering septums.

Filter 12 is supported and sealed through pressurized wet seal 26 to vacuum duct 28. The flow of fluid to be filtered is through the filter 12 into the vacuum duct 28 to the clean liquid tank 18 to which the vacuum duct is sealed. An end suction vertical centrifugal pump 30 sucks the liquid into its intake casing 32 in the direction of the arrows for delivery through outlet pipe 34 into clean liquid tank 18. Pump 30 is driven by motor 36 by a shaft, see FIG. 9, extending through casing 38. A single stage pump will normally be used for lower flow rates, for example from approximately 100 gpm to 350 gpm. With the use of larger filters 12 or multiple filters 12, a larger capacity pump such as a turbine pump having multiple stages can be used.

Filter 12 has a star configuration with a number of equally spaced filter panels or compartments 40. Preferably there are an even number of compartments arranged in diametrically opposed pairs. The compartment spacing or numbering of compartments is varied to meet the desired capacity and to accommodate the filter cake depth variation that will be encountered. Most commonly a six panel arrangement will be used with the individual panels spaced at 60° apart or an eight panel arrangement with the panels spaced at 45° apart as shown in FIGS. 2 and 5. With diametrically opposed panels 40 filter 12 can be easily installed in and removed from the settling tank 14 by the use of diametrically opposed guide channels 42 supported in the tank by structure 44 from the tank sidewalls. Each of the panels 40 has a lifting lug 46 attached to its top so that the filter can be lifted up and returned to the tank with opposed pair of panels 40 being received in guide channels 42. There is no requirement to match a particular pair of panels 40 with the guide channels 42.

A bump motor in the form of a pneumatic cylinder 48 is used to cause vertical displacement of the filter 12 in tank 14, impacting the filter against the tank structure through the seal 26 and vacuum duct 28 to jar and dislodge vacuum compressed filter cake from the filtering surfaces or septums of each panel 40. Bump motor 48 is supported on cross member 50 with its piston rod 52 removably connected to the filter through clevis connection 54. When the filter 12 is to be removed from the tank 14, the clevis connection 54 is opened. Hold down connections 56 are then loosened so that the cross member 50 can be slid along tracks 58 to provide clearance for vertical movement of the filter out of the tank.

In a regeneration cycle, the filter cake dislodged from the filtering septums is carried out of the tank by endless conveyor 59 to a discharge hopper 62.

During the regeneration cycle, the pump 30 is continuously operated to supply clean liquid to the machine tools or other devices being serviced from the clean liquid tank 18, but the vacuum release regeneration valve 60 is opened to equalize the system to atmospheric pressure creating a backflow releasing the filter cake. Control of the regeneration cycle including operation of bump motor 48 and valve 60 is accomplished by an automatic control system shown diagrammatically at 62 in FIG. 2.

Preferably, the regeneration cycle will be controlled by a differential pressure measurement in the filter collecting manifold or the vacuum duct which would allow the pressure to increase from 0 to 15" of Hg. When the differential pressure reaches the higher value, the regeneration bump cycle is commenced. One or more vertical impacts can be initiated as required. Alternatively, the regeneration bump cycle can be initiated on a timed or a combination timed-pressure cycle.

As shown in FIG. 1, a filter aid dispenser 64 with its supply hopper 66 may optionally be provided depending on the particle size being removed by the filter.

The pressurized wet seal 26 of this invention prevents infiltration of contaminating particles to the clean liquid flowing from the filter into the vacuum duct. Another function that the wet seal 26 performs is to allow relative motion between the filter 12 and the duct 28 in order to dislodge vacuum compressed filter cake from the filtering septum surfaces. In some filter configurations, the desired relative motion between the filter and the tank or vacuum duct will be a rotary motion such as that required for a doctor blade to scrape the filter cake from the filtering surface. In other cases, such as in the preferred star filter form of the invention, the desired relative motion is vertical reciprocating displacement. In any event, the pressurized wet seal 26 of this invention can accommodate either of such relative motions.

Figure 4:
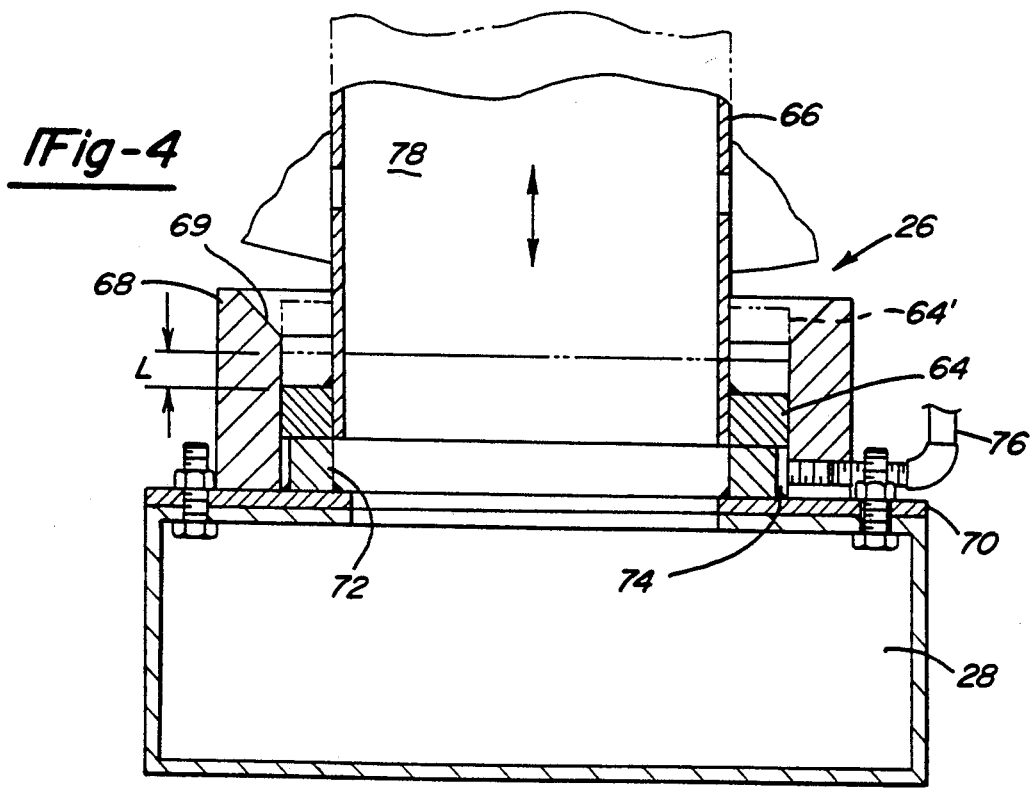
FIG. 4 is an enlarged view of the pressurized wet seal shown in FIG. 3.

Referring to FIG. 4 the wet seal 26 includes a bottom ring 64 extending radially outward from the bottom of the filter central vertical column 66. A receptor ring 68 is attached to and extends upwardly from the vacuum duct 28. As seen in FIG. 4, this attachment is effected by welding the receptor ring 68 to a mounting plate 70 which in turn is bolted to the vacuum duct. The bottom ring 64 of the filter is received in the receptor ring 68 with a positive small clearance such as 0.005" in order to insure a seal with a positive fluid flow path. Support anvil ring 72 is located within the receptor ring 68 attached to the vacuum duct 28 through the mounting plate 70. The support ring 72 supports and seals the filter by its contact with bottom ring 64. The support ring is radially spaced inward from the receptor ring to decline with the bottom ring 64 and receptor ring 68 the annular chamber 74. Liquid is admitted to chamber 74 through pipe connection 76 at a pressure sufficient to insure positive outflow between the bottom ring 64 of the filter and the receptor ring 68 attached to the vacuum duct. The pipe 76 is fed clean filtered liquid from the clean liquid tank 18. The clean liquid collecting manifold or filtrate receiver duct 78 of the filter is within central column 66 in communication with the vacuum duct 28 through the seal.

The pressure in the filter is allowed to vary from a clean filter condition of 0" of Hg. to a differential pressure of 15" of Hg. which will signal the commencement of a regeneration cycle. A sealing liquid pressure of 10 psi within the annular chamber 74 will insure that any flow of clean liquid will be inwardly between the bottom ring 64 and the support ring 72 with a continuous outflow between bottom ring 64 and receptor ring 68 into settling tank 14. The receptor ring 68 is dimensioned relative to the bottom ring 64 so that the bottom ring 64 remains sealed within the receptor ring 68 for the entire vertical stroke L. Bevel 69 at the top of receptor ring aids in alignment and installation of filter 12 into the settling tank 14.

Vacuum release valve 60 is used not only to equalize the pressure in the filter to atmospheric causing a backflow during regeneration, but it is also used to equalize the pressure when the filter is being removed from the tank. The level of clean liquid in clean tank 18 is maintained above the level of dirty or contaminated liquid in set-L-ling tank 14 so that there will be an outflow of liquid through the seal maintaining it in a clean condition until the filter is replaced.

Referring to FIGS. 5-8, the details of the star filter of this invention are shown. The individual filter panels or compartments 40 are made up of frame work attached to the central column 66. This framework includes top and bottom channel members 80 and 82, a series of radially spaced, vertically extending support bars 84, a pair of filter septums 86 defining downwardly extending sidewalls of each compartment, and a removable vertically extending end cap 88.

In a preferred embodiment of the invention, the septums diverge outwardly as they extend upwardly so that during the regeneration cycle when vacuum compressed filter cake is being dislodged from the surface of the septum, it will free fall vertically toward the conveyor 59 instead of sliding along the surface of the septums 86. This is accomplished by tapering the vertically extending support bars 84 from a wider top end 90 to a narrower bottom end 92 with a corresponding taper to end cap 88. Also the top channel 80 is wider than the bottom channel 82. Free fall of filter cake from these septums surfaces 86 are shown by the arrows in FIGS. 6 and 7.

The septums 86 are made with a suitable screen material of metal or plastic. Preferably they are made with stainless steel, and in the preferred embodiments shown, they are made with stainless steel wedgewire which is self cleaning in the regeneration cycle. Other materials can be used such as microscreen and the like. The vertical support bars 84 are mounted to the top and bottom channel members 80 and 82 by the use of slotted assembly pins 94 and 96 with cap screws 98 which extend through radially spaced holes 100 in the top and bottom channel members 80 and 82. The septums 86 rest on the overhanging portions 102 of the pins 94 and 96 and against the sides 104 of the support bars 84. The septums are preferably sealed to the framework with a resilient sealant such as a silicone rubber caulk as shown at 101, sealing to the top and bottom channel members 80 and 82.

A slotted end cap 88 is removably attached to the compartment or panel assembly by threaded rods 106 and nuts 108. This allows easy removal of the end cap 88 and sliding of the septums 86 out of the assembly without disassembly of the other members. However, the ability to disassemble permits changing of individual parts such as the vertically extending support bars 84 which, in turn, permits changing the septum material and dimensions. For example, a change could be made from the wedgewire septums shown best in FIG. 8 to microscreen septums.

In a preferred form of the invention, the top and bottom channel members 80 and 82 are tapered as shown best in FIGS. 1, 3 and 5. Top channel 80 slopes downwardly from its taller end 110 at column 66 to its shorter end 112 passing into end cap 88. This defines a top gas collection passageway 114 above the septums 86 in continuous fluid communication with collecting manifold 78 through a top orifice 116 in central column 66. This assures that cases do not collect in the panel compartments 40 which reduces the efficiency of the filter and could cause pump cavitation. The bottom channel 82 slopes upwardly from its taller end 118 at column 66 to its aborter end 120 that passes into end cap 88. This defines a bottom migration contaminant passageway 128 below the septums 86 in continuous fluid communication with collecting manifold 78 through bottom orifice 122 in column 66.

Selective control of the flow through the septums into the collecting manifold is obtained by the use of a series of vertically spaced orifices 124 in column 66 between the top orifice 116 and bottom orifice 122 for each compartment 40. Each of these orifices is tapped to accept a standard pipe plug 130 so that the array of orifices can be selectively plugged or left open to control the flow pattern and rate through the individual panels or compartments. As indicated in FIG. 1, filter aid dispenser 64 and supply hopper 66 may be optionally provided so that the filter can be used with various types of precoats of the cellulose and non cellulose types or the filter can be operated in a "self coated" mode to control the size particles being removed. Appropriate adjustment of the open orifices 124 can be made to accomodate the desired change in flow rate from the precoat used.

Referring to FIG. 9, it can be seen that the overall tank structure 16 can be built with only a single chamber settling tank 14, eliminating the integral clean liquid regenerating tank 18. In this instance the clean tank 126 can be located at floor level or above with the pump shown as a multistage turbine pump 127 located directly in the contaminated or dirty liquid of settling tank 14 by the use of the same pressurized wet seal 26 used for the filter 12 shown in FIGS. 1, 3 and 4. In this case, the bottom ring 64 is attached to the pump casing 38 with the receptor ring 68 and support ring 72 being attached to the vacuum duct 28. The wet seal annular chamber 74 is similarly supplied clean, filtered liquid through an inlet pipe 76, and a provision for equalizing the vacuum chamber can be provided by the regeneration valve 60 in equalization line 128 connecting the clean liquid tank 126 and vacuum duct 28.

The embodiments of the invention in which an exclusive property of privilege is claimed are defined as follows:

1. A filtration system apparatus including a settling tank with a contaminated liquid therein and a filter inside of said settling tank immersed in said contaminated liquid to be filtered, and a pressurized wet seal sealing filtrate receiver means, which communicates with said filter, to a vacuum duct carrying filtered liquid, said seal comprising:

a bottom ring extending radially outward from the bottom of said filtrate receiver duct means;

a receptor ring attached to said vacuum duct having a radially inner surface and outer surface, said radially inner surface is slideably engaged to the outward most extention of said bottom ring;

a base ring within said receptor ring and attached to said vacuum duct, said base ring being in sealing contact with said bottom ring and being radially spaced inward from said receptor ring to define with said bottom ring and said receptor ring an annular chamber; and a pipe means for supplying liquid under pressure to said annular chamber to prevent infiltration of contaminated liquid into said vacuum duct.

2. The filtration system apparatus of claim 1 wherein passage means from said filtrate receiver duct means to said pipe means is arranged to supply filtered liquid under pressure to said annular chamber.

3. The filtration system apparatus according to claim 1 including a mounting plate through which said base ring and said receptor ring are attached to said vacuum duct.

4. The filtration system apparatus according to claim 1 wherein said filtrate receiver duct means is said filter having a central vertically extending column with an internal collecting manifold in fluid communication with said vacuum duct through said seal, and said bottom ring is located at the bottom of said column.

5. The filtration system apparatus according to claim 4 wherein said bottom ring, receptor ring and base ring are configured to allow relative movement between said filtrate receiver duct means and said settling tank during a regenration cycle for removal of vacuum compressed filter cake from said filter.

6. The filtration system apparatus according to claim 5 wherein said bottom ring, receptor ring and base ring are configured to allow vertical displacement of said filtrate receiver duct means relative to said settling tank.

7. The filtration system apparatus according to claim 1 wherein said filtrate receiver duct means is a vertically extending casing with said bottom ring being located at the bottom of said casing and a pump attached to the top of said casing.

* * * * *